Nov. 28, 1961 C. F. CLIFFORD 3,011,111

ELECTRO-MECHANICAL OSCILLATORS

Filed Nov. 10, 1958

United States Patent Office 3,011,111

Patented Nov. 28, 1961

3,011,111

ELECTRO-MECHANICAL OSCILLATORS

Cecil Frank Clifford, % New Bridge Works, Bath, Somerset, England

Filed Nov. 10, 1958, Ser. No. 772,915
Claims priority, application Great Britain Nov. 22, 1957
10 Claims. (Cl. 318—128)

This invention relates to electro-mechanical oscillators having an electrically maintained mechanical oscillating member, and to motor and escapement mechanisms employing these oscillators.

The object of the invention is to provide an improved oscillator of the above type, and mechanisms employing the oscillator.

According to one form of the present invention, an electro-mechanical oscillator has a mechanical member adapted to be electrically maintained in oscillation by a signal coil and a driving coil mounted on the said mechanical member, the signal coil being arranged to develop an induced signal as the mechanical member oscillates, said signal being supplied to the input of an amplifier and the driving coil being energised from the amplifier output.

According to another form of the present invention, there is provided an oscillator motor mechanism which comprises an electro-mechanical oscillator according to the present invention, and the oscillating mechanical member moves means co-operating with and driving a rotating member. Conveniently, the rotating member is connected to a gear train.

The amplifier of the oscillator is conveniently an electronic amplifier; a valve amplifier is quite suitable but it is preferred to use a transistor amplifier as this is more compact and electrically more economical.

When a transistor amplifier is used, the transistor may itself be mounted on the oscillating member. The connections from the signal and driving coils to the amplifier can then be made between components which are not in relative motion. It is possible to mount the current supply source for driving the amplifier on the mechanical oscillating member also, but it is considered more convenient to use the control springs of the oscillating member as conductors from the transistor mounted on the oscillating member to a fixed battery.

Alternatively, both the transistor amplifier and its current supply source may be fixedly mounted separately from the oscillating member and the electrical connections to the signal coil and the driving coil may be made by way of the control springs of the oscillating member.

The signal coil is mounted on the oscillating mechanical member in such a manner that a signal is induced in the coil due to its oscillation in a magnetic field. The magnetic field is preferably provided by a local permanent magnet.

The driving coil receives an amplified signal from the amplifier and provides a driving force to maintain the mechanical member in oscillation by co-operating with a member of magnetic material preferably a second permanent magnet.

As stated above, the signal and driving coils are mounted on the oscillating member and may conveniently oscillate linked with the flux of two fixed permanent magnets. However, it is possible to visualise an arrangement in which the magnets themselves oscillate, for example at the same frequency, but in contrary sense i.e. in contra phase with the coils.

The oscillating mechanical member may take any desired form. For low-frequency oscillator, this member may be a pendulum suspended from a suitable pivot. The signal and driving coils may then be mounted at the lower extremity of the pendulum so that they swing in an arc relatively to two fixed magnets or to the opposite poles of a single fixed magnet.

Alternatively, the mechanical member may be pivoted about its centre of gravity so that it performs a see-saw movement. In such an arrangement, the member may comprise a plate adapted to oscillate about a transverse axis and controlled by two or more hair-springs which would also act to conduct current in and out from the oscillating assembly.

The signal and driving coils are then conveniently mounted at opposite ends of the bar member so that they move through diametrically opposite arcs of the circumference of a circle. The signal and driving coils may then oscillate relatively to two fixed magnets or relatively to the opposite poles of a single magnet, having its opposite poles co-operating one with the signal coil and the other with the driving coil.

The supporting means for the mechanical oscillating member conveniently serve also as electrical conductors between the signal and driving coils and the amplifier or so as to supply current to the amplifier if the amplifier is itself mounted on the oscillating member.

An electro-mechanical oscillator in which the signal and driving coils are mounted on the oscillating member offers a number of practical advantages. Less eddy currents are induced in local metal bodies, resulting in lost power, than would be the case with oscillating magnets and fixed coils. Orientation with respect to the earth's magnetic field or other local fields has no effect on the oscillator frequency. Also, the arrangement permits the use of larger magnets than is usually practicable if these are mounted on the oscilalting member.

An oscillator according to the invention may be used, for example, to provide a standard frequency electric signal. Shuch an electrical signal may be derived from either the signal or the driving coil, and further amplified as required, or it may be derived from a separate coil arranged to oscillate relatively to a further magnet.

When an oscillator according to the invention is used as a part of an escapement mechanism, further members may be mounted on the oscillating mechanical member to co-operate with and control a driven escapement wheel. To avoid frictional loss, the connection between such escapement wheel and the oscillator is preferably a magnetic connection, and a number of suitable arrangements are described in British Patent No. 596,216.

When an oscillator according to the invention is used to drive the rotor of a constant-speed electric motor, the connection between the oscillator and the rotor is preferably a magnetic connection, as in British Patent No. 632,264.

If the motor is to be self-staring, it is desirable that torsional oscillations in the rotor shaft shall be limited. This may be achieved by providing on the rotor shaft a loose fly wheel stabiliser of suitable dimensions, such as is described in British Patent No. 798,261.

In order that the invention may be readily carried out, a preferred embodiment of an oscillator motor according to the invention, will now be particularly described by way of example, with reference to the accompanying drawings in which.

Figures 1, 2, 3, 4:
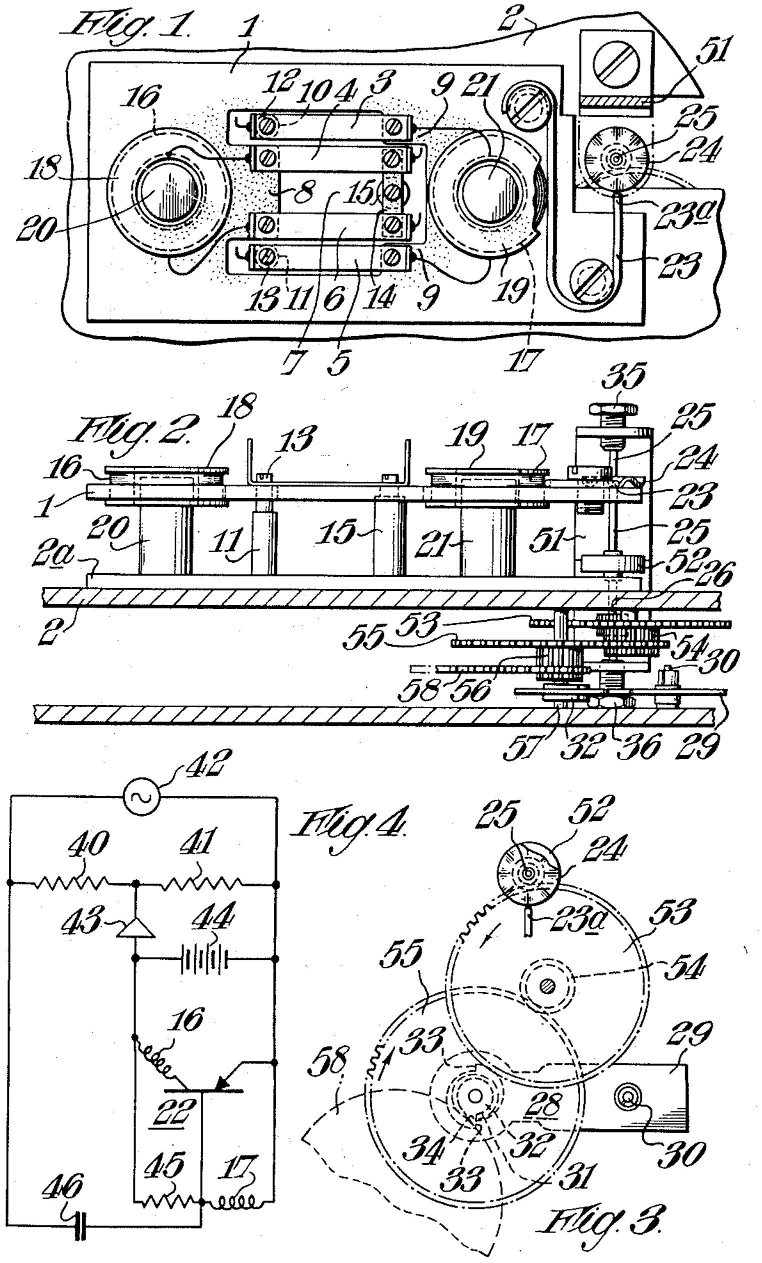
FIGURE 1 shows in plan view an oscillator motor mechanism according to the invention.
FIGURE 2 shows, in side elevation, the oscillator motor shown in FIGURE 1, together with a gear train driven by the motor.
FIGURE 3 shows a uni-directional device as built into the mechanism shown in FIGURES 1 and 2.
FIGURE 4 is a circuit diagram showing the circuit arrangement of a synchronised transistor oscillator motor according to the invention.

The oscillator unit of the motor shown in detail in

FIGURES 1 and 2 has, as the oscillating mechanical member, a flat rectangular plate of insulating material 1 attached to a heavy base plate 2 by four leaf springs 3, 4, 5 and 6. These springs are permitted to flex so that the plate 1 oscillates with a vibratory, see-saw movement about a transverse axis passing approximately through the centre of the plate and the centre of the four springs.

The plate has an irregular shaped aperture 7 at its centre. This is generally of rectangular shape but has a tongue 8 extending inwardly from one end and lands 9 left at the corners opposite this end.

The four leaf springs 3, 4, 5 and 6 are made of "Ni Span C" metal of about 0.004" thickness. These are arranged parallel to each other, in the same plane when in the unflexed condition, and lie within the aperture 7 in the oscillating plate 1.

The two outer springs 3 and 5 of the four are supported on the top of two insulating pillars 10 and 11. The pillars are mounted on the baseplate 2 perpendicularly thereto and the springs are secured to the tops of the pillars by screws 12 and 13 respectively. The other ends of the springs are secured to the lands 9 at the corners of the oscillating plate aperture 7. The two inner springs 4 and 6 are attached at their corresponding ends to the tongue 8 of the oscillating plate aperture and at their respective other ends to a bridge 14 carried on the top of a further pillar 15 mounted on the baseplate.

In this arrangement it is necessary for the leaf springs 3, 4, 5 and 6 all to have the same working length and for the fixing screws 12 and 13 to have the same diameter heads. Similarly, the supporting pillars 10, 11 and 15 also have the same diameter.

At opposite ends of the oscillating plate are mounted two coils 16 and 17, each approximately 11.5 mm. diameter and 4 mm. thick, having an internal diameter of 5.5 mm. Each coil is wound on a plastic former 18 and 19 respectively and comprises 2,000 turns of 48 S.W.G. enamel covered copper wire. The coil 17 is a signal coil and the coil 16 a driving coil.

Two cylindrical permanent magnets 20 and 21 (4.7 mm. diameter) of the material sold under the registered trademark "Ticonal" are mounted in the baseplate, extending through the baseplate to the underside thereof. These magnets have opposite poles projecting upwards from the baseplate and passing through the ends of the oscillating plate one inside each of the coils 16 and 17 mounted thereon. Above the baseplate 2, the ends of the two magnets 20, 21 are bridged by a soft iron bar 2*a*, so that the two magnets 20, 21 and the soft iron bar 2*a* form part of a single magnetic circuit producing a magnetic field in the region of the signal and driving coils 16 and 17.

The leaf springs 3, 4, 5 and 6 serve both as the resilient supports for the oscillating plate and as conductors from terminals fixed relatively to the baseplate, to the signal and driving coils. To this end, the extremities of the leaf springs are bent up to form soldering tags, the signal coil 17 being connected to the ends of one pair of springs 3 and 5 and the driving coil 16 to the other pair 4 and 6.

Mounted on the oscillating plate 1 is an S-shaped wire permanent magnet 23. One end 23*a* of the permanent magnet overlaps a stepped portion of the plate 1 so that its tip faces the circumferential edge of a crinkled washer rotor 24 of magnetic material. The crinkled form of the rotor 24 is such as to provide an undulating circumferential edge which presents, by rotation of the rotor 24, a substantially sinusoidal magnetic track in front of the tip 23*a* of the magnet 23.

The rotor 24 is fixed on a spindle 25 which is rotatably mounted between pivots 35 and 36 carried in a bracket 51. The spindle 25 extends through the baseplate 2 and also carries a small fly-wheel 52, which is mounted loose on the spindle 25, and a driving pinion 26 mounted on the spindle 25 below the baseplate 2.

Pinion 26 drives a speed-reduction gearing comprising a driven spur wheel 53 and pinion 54 mounted on a common spindle and driven spur wheel 55 and pinion 56 mounted on a common spindle 57. Pinion 56 drives a following spur wheel 58.

Spindle 57 also carries a cam wheel 32, the cam of which has one inclined face and one stepped face 34, and which co-operates with an oscillating stop member 28. The stop member 28 comprises an arm 29 pivoted on a pin 30, the end of the arm 29 remote from the pivot pin 30 being apertured to embrace the cam wheel 32. The aperture is formed by two adjoining semi-circular apertures having displaced centres so as to provide a combined aperture having diametrically opposite steps 33 facing the perpendicular step 34 of the cam wheel 32.

Referring now to FIGURE 4, which shows the electrical connections between various parts described with reference to FIGURES 1 and 2, the signal coil 17 is connected in the emitter-base circuit of a junction type transistor amplifier 22 and the driving coil 16 is connected in the collector-base circuit of the amplifier in series with a resistor 45 of value 39K. ohms. The junction of the driving coil 16 and resistor 45 is connected to the negative pole of a D.C. source 44, which is a 6 volt rechargeable battery. The positive pole is connected to the transistor emitter.

An alternating current source 42, which may conveniently be a 50 c./s. A.C. supply mains, has one pole connected to the positive pole of the D.C. source 44 and is bridged by a potentiometer comprising series-connected resistors 40 and 41. The junction of resistors 40 and 41 is connected to the negative pole of the D.C. source 44 through a rectifier 43 connected in the conducting sense to provide a charging current to the D.C. source 44.

The pole of the A.C. supply 42 which is not connected to the transistor emitter is connected through a capacitor 46 to the junction of the signal coil 17 and resistor 45. The value of resistor 45 can be critically determined so that plate 1 begins to oscillate when the supply 42 is connected.

As explained above, the signal coil 17 is connected to the input of a transistor amplifier 22 while the driving coil 16 is supplied from the output thereof. Thus, as the plate 1 oscillates, the signal coil 17 oscillates relatively to the magnet 21 passing through the centre of the coil. A substantially sinusoidal voltage is thus induced in the signal coil 17 which provides an input current to the transistor 22. An amplified current then flows in the transistor output through the driving coil 16, which is so phased in relation to the polarity of the magnet pole 20 passing through the centre of the coil as to add the movement of the oscillator producing the signal. In this way, the oscillator is electrically maintained, the driving power being derived from the D.C. source 44 supplying the transistor.

Oscillation of the plate 1 causes the tip 23*a* of the magnet 23 to oscillate with simple harmonic motion transversely of the edge of the rotor 24. This oscillatory motion of the magnet tip 23*a* produces rotary movement of the rotor 24 until the circumferential velocity of the rotor is such that the magnet tip 23*a* follows the undulating path of the circumferential edge.

The drive is equally effective for either sense of rotation of the rotor 24 so that, on commencement of oscillation of the plate 1, the rotor 24 may be started in motion in either direction.

Referring now to FIGURE 3, if the rotor 24 is started in motion in the clockwise sense, as seen in the drawing, the cam wheel 32 is also driven in the clockwise sense through the speed reduction gearing. In this case, the inclined face of the cam wheel 32 engages the inner face of the aperture in the stop member 28 causing it to pivot from side to side about the pivot pin 30 as the cam wheel 32 rotates. Rotation in this sense is not impeded, therefore.

If the rotor 24 is started into motion in the counter-clockwise sense, however, the cam wheel 32 is correspondingly driven in the counter-clockwise sense. In this latter case, the step 34 of the cam wheel 32 abuts against one of the steps 33 and the motion of the gear train is arrested. The shock of the abutment of the opposed faces is initially absorbed by the resilience of the stop member, and is then transmitted back through the gear train as an impulse in the opposite rotational sense. The rotor is thus restarted in motion in the clockwise sense, and this rotation is then maintained by the oscillating magnet tip **23*a***.

The oscillating mechanical system comprising the plate 1, the parts mounted thereon and the springs 3, 4, 5 and 6 has a natural frequency of vibration approximately, but not necessarily exactly, equal to the frequency of the supply mains 42, in this example 50 c./s. A small current from the A.C. supply 42 flows through the series circuit comprising the capacitor 46 and the signal coil 17. This current provides an input to the transistor 22, so that the frequency of oscillation of the oscillator is locked to the A.C. supply frequency.

In the event of failure of the A.C. supply 42 or its temporary disconnection from circuit, the oscillator continues in operation at its natural frequency, the driving power being supplied from the storage battery 44.

I claim:

1. An electromechanical oscillator comprising a plate, spring means supporting said plate for oscillation about an axis in the plane of said plate, signal and driving coils mounted on said plate on opposite sides of said axis, means to produce a magnetic field through each of said coils, and an amplifier having its input connected to said signal coil and its output connected to said driving coil.

2. An oscillator as claimed in claim 1 wherein said means to produce a magnetic field through said signal and driving coils comprises two fixed magnets.

3. An oscillator as claimed in claim 2 wherein said magnets are permanent magnets.

4. An electromechanical oscillator comprising an oscillatory member consisting of a rectangular plate, a plurality of springs supporting said plate for mechanical oscillation about a transverse axis in the plane of said plate, a signal coil mounted on said plate on one side of said axis, a transistor amplifier having its input connected to said signal coil, a source of direct current to supply power to said amplifier, a driving coil mounted on said plate on the other side of said axis and connected to the output of said amplifier, and a permanent magnet for each of said coils, each said permanent magnet projecting into the respective coil.

5. An electromechanical oscillator comprising a plate-like oscillatory member, four leaf springs supporting said member for oscillation about a transverse axis lying in the plane of said member, signal and driving coils mounted on said member equally spaced from said axis on opposite sides thereof, each end of each coil being electrically connected to one of said springs, means to produce a magnetic field through each coil, a transistor amplifier having its input connected to the fixed ends of the leaf springs connected to said signal coil and its output connected to the fixed ends of the leaf springs connected to said driving coil, a rechargeable battery to supply power to said amplifier, an alternating current supply, rectifier means connected to said battery and to said supply to charge said battery, and an impedance, said member having a natural oscillation frequency substantially equal to the frequency of said supply, and said signal coil being connected in series with said impedance across said supply, whereby said member oscillates at the frequency of said supply.

6. An electromechanical oscillator comprising a mechanical oscillatory member, four springs supporting said member for oscillation about an axis lying in the center of said member, a signal coil mounted on said member on one side of said axis having its ends electrically connected respectively to two of said springs, a driving coil mounted on said member on the other side of said axis having its ends electrically connected respectively to the other two of said springs, amplifier means having its input connected to said signal coil and its output connected to said driving coil, means to produce a magnetic field through each said coil, means to supply direct current to said amplifier, whereby said member is maintained in mechanical oscillation at its natural frequency, and drive means mounted on said member cooperating with rotary driven means to convert the oscillatory movement of said member into rotational movement of said rotary driven means.

7. An oscillator as claimed in claim 6 comprising a spindle on which said rotary driven means is mounted, and a stabilizing flywheel loosely mounted on said spindle.

8. An oscillator as claimed in claim 6 comprising speed reduction gearing connected to said rotary driven means, said gearing including a device which permits rotation in one sense only.

9. An oscillator as claimed in claim 7 comprising speed reduction gearing connected to said rotary driven means, said gearing including a device which permits rotation in one sense only.

10. An electromechanical oscillator comprising an oscillatory member consisting of a flat plate, four springs each attached at one end to said plate and supporting said plate for mechanical oscillation about an axis lying in the plane of said plate, a signal coil mounted on said plate on one side of said axis having each end thereof connected to the said one end of one of said springs, a transistor amplifier having its input connected to the other ends of the springs connected to said signal coil, a power supply for said amplifier, a driving coil mounted on said plate on the other side of said axis having each end thereof connected to the said one end of one of said springs not connected to said signal coil, the other ends of the two last-mentioned springs being connected to the output of said amplifier, and permanent magnet means to provide a magnetic field through each of said coils.

References Cited in the file of this patent

UNITED STATES PATENTS

| | | |
|---|---|---|
| 2,475,200 | Roys | July 5, 1949 |
| 2,594,749 | Ehrat | Apr. 29, 1952 |
| 2,606,222 | Clifford | Aug. 5, 1952 |
| 2,900,786 | Hetzel | Aug. 25, 1959 |
| 2,929,196 | Hetzel | Mar. 22, 1960 |
| 2,943,215 | Pommeret | June 28, 1960 |

FOREIGN PATENTS

| | | |
|---|---|---|
| 1,092,411 | France | Nov. 10, 1954 |
| 1,134,560 | France | Dec. 3, 1956 |